United States Patent [19]

DeCourcy

[11] 4,212,234

[45] Jul. 15, 1980

[54] BAKING MOLD ASSEMBLY

[76] Inventor: Charles N. DeCourcy, 3022 Teton Cir., Huntsville, Ala. 35810

[21] Appl. No.: 895,432

[22] Filed: Apr. 11, 1978

[51] Int. Cl.³ .......................... A23P 1/00; B22C 9/24
[52] U.S. Cl. ...................................... 99/426; 99/441; 249/141; 249/144; 426/514
[58] Field of Search ................. 99/441, 428, 442, 353, 99/354, 382, 383, 359, 380, 381, 426; 249/144, DIG. 1, 141; 426/496, 512, 514, 499

[56] References Cited

U.S. PATENT DOCUMENTS

| | | | |
|---|---|---|---|
| 32,169 | 4/1861 | Adams | 249/144 X |
| 122,076 | 12/1871 | Story | 249/144 X |
| 801,915 | 10/1905 | Robinson | 249/144 X |
| 823,963 | 6/1906 | McNamire | 249/144 |
| 1,227,824 | 5/1917 | Pelton | 249/144 X |
| 1,531,569 | 3/1925 | Rade | 249/DIG. 1 |
| 1,627,757 | 5/1927 | Von Elm | 249/144 |
| 2,078,477 | 4/1937 | Whiting | 249/144 X |
| 2,376,414 | 5/1945 | Billner et al. | 249/144 X |
| 2,453,804 | 11/1948 | McDearmon | 249/144 X |
| 3,262,668 | 7/1966 | Luker | 99/428 X |

*Primary Examiner*—Stanley N. Gilreath
*Attorney, Agent, or Firm*—C. A. Phillips

[57] ABSTRACT

A baking mold assembly employing a plurality of spaced vertical batter containers removably positioned on a horizontal base plate. Each batter container consists of two removable tubes, one concentrically about the other end, with sufficient space between them for the inclusion of a batter.

3 Claims, 5 Drawing Figures

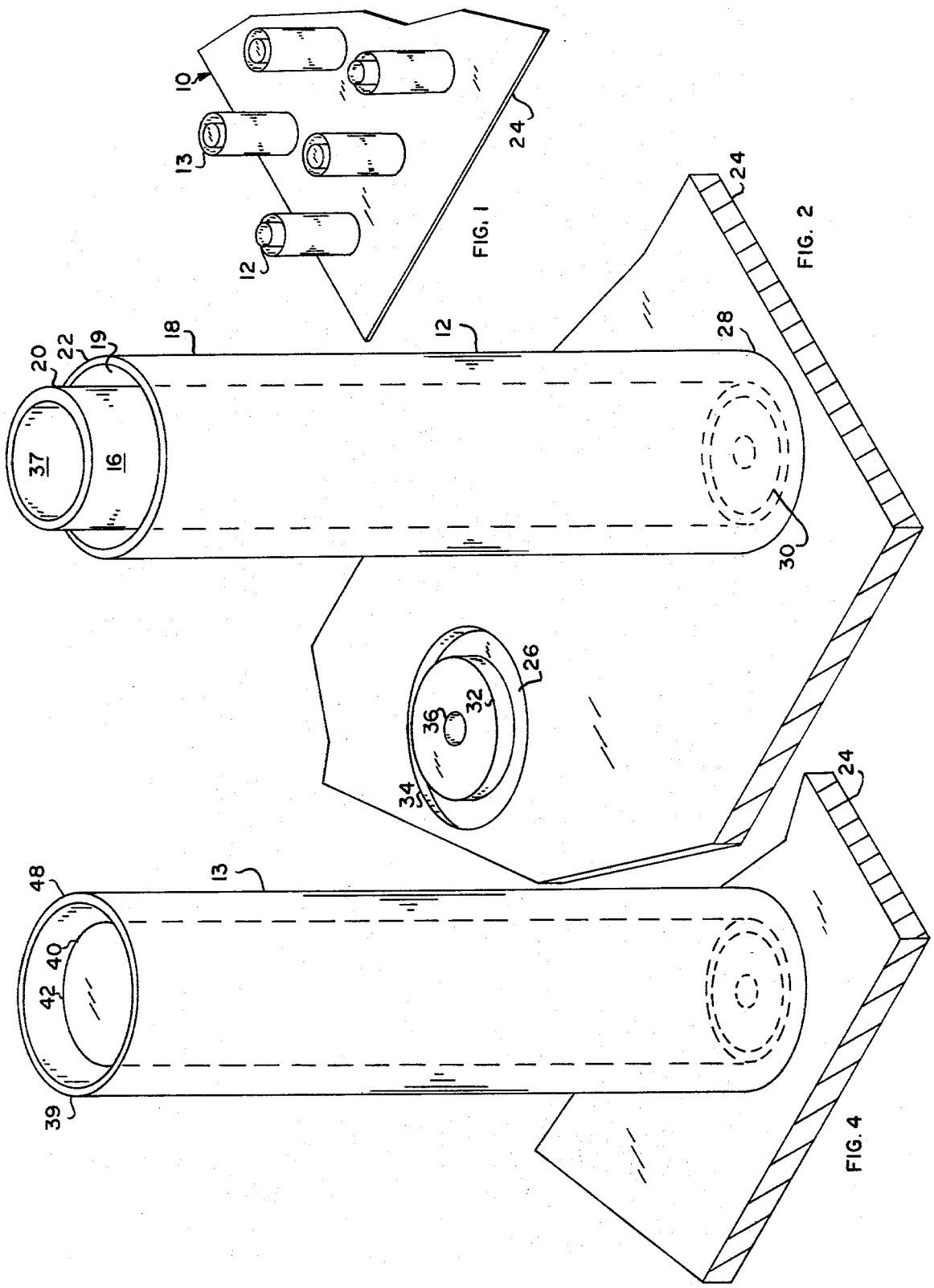

BAKING MOLD ASSEMBLY

BACKGROUND OF THE INVENTION

1. Field of the Invention

This invention relates to cooking devices, and more particularly to containers which hold and shape batter as it is cooked, thus producing a specifically shaped bakery product.

2. General Description of the Prior Art

Various cooking devices produce a bakery product that includes a small opening or indentation for the inclusion of a filling. However, the inventor is unaware of any cooking device that will produce a finished bakery product in any form that is suitable for the containment of a generous amount of filling.

SUMMARY OF THE INVENTION

In accordance with this invention, a baking mold includes a plurality of upright batter containers removably positioned on a horizontal plate. Each batter container is formed of an outer tube concentrically about an inner tube which is of a considerably smaller diameter, thus providing a cavity between the two tubes for the inclusion of a batter.

BRIEF DESCRIPTION OF THE DRAWINGS

FIG. 1 is a broken pictorial view of an embodiment of the invention.

FIG. 2 is an enlarged broken view of a part of the embodiment shown in FIG. 1.

FIG. 4 is an enlarged broken view of a part of the embodiment shown in FIG. 1.

DETAILED DESCRIPTION OF THE DRAWINGS

Figure 3:
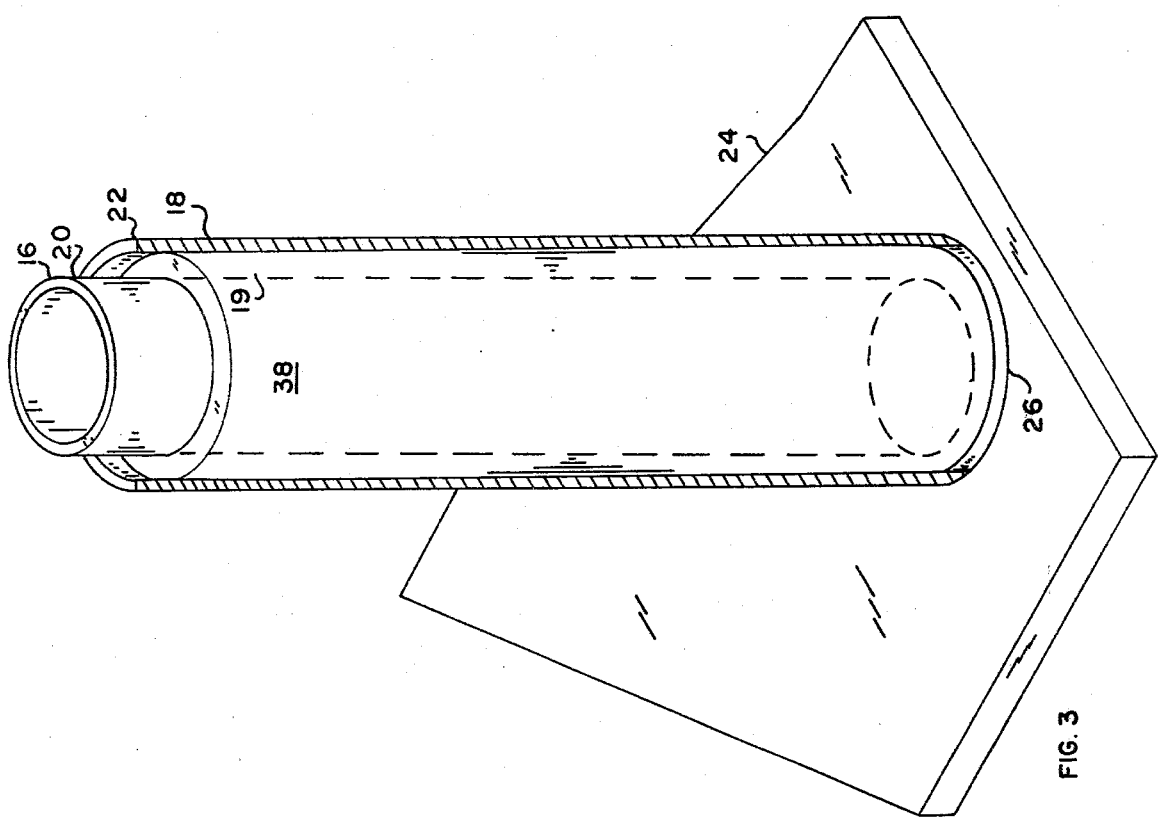
FIG. 3 is a broken view of the embodiment shown in FIG. 2 and further including a batter to be baked.

Referring to FIG. 1, cooking device 10 includes a plurality of vertical batter containers 12 and 13. Each batter container 12 (FIG. 2) includes a concentrically positioned inner tube 16 and outer tube 18 normally formed of metal and which are sufficiently different in diameter, approximately 1½ and 2½ inches, respectively, to form a cavity 19 between them. Tubes 16 and 18 are open at upper ends 20 and 22, respectively, and inner tube 16 extends slightly above outer tube 18. The tubes are approximately five and four inches, respectively, in length. A base plate 24 normally formed of metal includes a plurality of annular recesses 26 which function as receptacles for pairs of tubes 16 and 18. Thus, each recess 26 includes an inner circumference 32 which frictionally engages and holds lower end 30 of inner tube 16 and an outer circumference 34 which frictionally engages and holds lower end 28 of outer tube 18. Opening 36 is centered interior of recess 26, and it extends through base plate 24 and functions to further flow to inner surface 32 of inner tube 16.

In use, base plate 24 is placed on the heating element of a stove (not shown), with batter containers positioned in recesses 26.

As shown in FIG. 3, cavity 19 is filled with a batter 38, such as a cornbread batter, to near end 22 of tube 18, thus leaving upper end 20 of inner tube 16 above batter 38. The bakery product, formed of batter 38, is, after cooking, removed by first removing outer tube 18, and then removing the bakery product from about inner tube 16. Thus, a bakery product is formed that is tubular and open at both ends and suitable for the inclusion of a filling (not shown), such as beans.

Batter containers 13 (FIGS. 1 and 4) are similar to batter containers 12. Thus, outer tube 39 is positioned within recess 26 of plate 24 in a manner identical to that of tube 18 and surrounds an inner tube 40 which is identical in diameter to tube 16 and is positioned in recess 26 in an identical manner to tube 16. Unlike tube 16, tube 40 includes sealed upper end 42 which terminates slightly below end 43 of tube 39.

Figure 5:
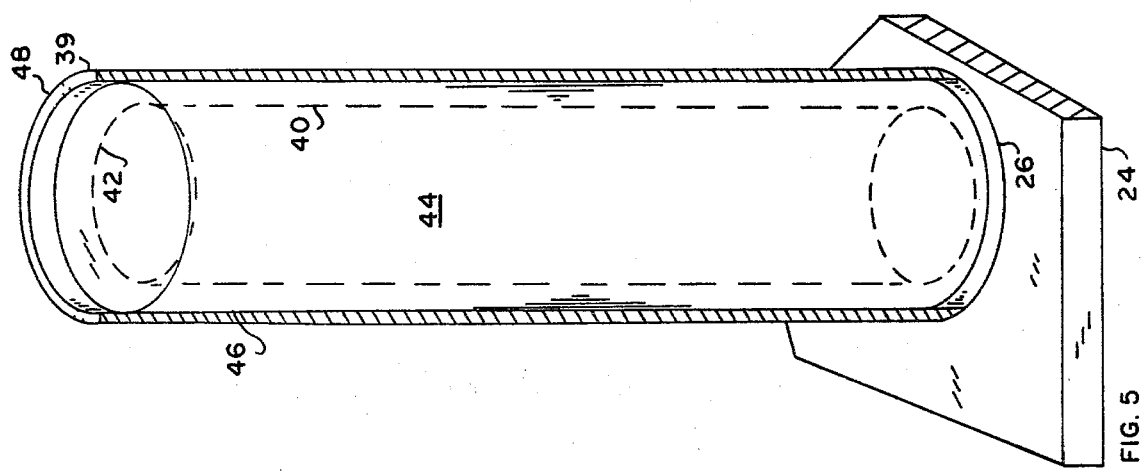
FIG. 5 is a broken view of the embodiment shown in FIG. 3 and further including a batter to be baked.

In use, and referring to FIG. 5, batter container 13 is positioned in recesses 26 of plate 24, and batter 44 is poured into cavity 46, filling it to near upper end 48 of tube 39, thus covering sealed upper end 42 of inner tube 40, represented by dotted lines in FIG. 5. After batter 44 is cooked, outer tube 39 is removed, and the finished bakery product formed of the batter is removed from about inner tube 40. The finished bakery product, when inverted, forms a cup-like container for the inclusion of a filling (not shown).

It is to be noted that any desired combination of batter containers 12 and 13 may be positioned on plate 24, thus enabling the production of two differently configured bakery products at the same time.

Having thus described my invention, what is claimed is:

1. The method of making a configured baking product comprising:
    commencing with a generally flat plate having a plurality of spaced receptacles in its surface wherein each receptacle is adapted to hold a pair of spaced concentric tubes, and there is an opening in said plate interior of each said receptacle;
    placing in each receptacle a pair of metal tubes concentrically spaced ½ inch to ⅝ inch apart; and
    placing a batter in the region between said tubes and applying heat to said batter, including the supplying of heat upward through said openings.

2. The method as set forth in claim 1 where an end of the inner tube of at least one of said pairs of tubes, an end opposite the end engaging said receptacle, is closed and said batter is poured to extend above and across said closed end.

3. The method as set forth in claim 1 wherein the inner tube of at least one of said pairs of tubes is at least as long as the tube positioned around it, and it extends a distance from said plate at least equal to the distance of extension from said plate of the outer tube surrounding it, and said batter is poured to form an open ended cylinder.

* * * * *